Patented Mar. 10, 1970

3,499,375
SHUTTER ALARM DEVICE FOR FLASH
PHOTOGRAPHING
Tatsuo Kobayashi, Kaizuka, and Hiroshi Ueda, Nara,
Japan, assignors to Minolta Camera Kabushiki Kaisha,
Minami-ku, Osaka, Japan, a Japanese corporation
Filed May 19, 1967, Ser. No. 639,806
Claims priority, application Japan, May 21, 1966,
41/32,386; May 26, 1966, 41/33,824; June 1,
1966, 41/35,273
Int. Cl. G03b *19/00, 3/00, 17/00*
U.S. Cl. 95—11       3 Claims

ABSTRACT OF THE DISCLOSURE

An alarm device for a photographic camera which warns the operator if the exposure setting is not properly set for making a flash exposure. The alarm device is made up of a first sensing member which is pivotably mounted on the shutter casing of the camera and has a sharpened tip, and a click cam secured to the distance control ring of the camera which is engageable with the sharpened tip. The guide number ring of the camera has a cam surface which cooperates with a pin on the sensing member to control the position of the sensing member with respect to the click cam in accordance with the particular setting of the guide number ring and the distance ring. If the distance control ring is moved beyond the maximum allowable distance for making a flash exposure, the sharpened tip of the sensing member will engage the click cam and produce a clicking noise thereby warning the operator that the camera is not properly set for making a flash exposure. A second sensing member which is also pivotably mounted on the shutter casing, engages the distance control ring to prevent further rotation of the ring if the operator has reached the minimum allowable distance setting for making a flash exposure.

---

This invention is related to a shutter alarm device for flash photographing, and more particularly to a device for sounding an alarm in the case of insufficient exposure setting for flash photographing, which device is mountable on a shutter having a distance ring interlocked with lens aperture of the shutter.

Generally speaking, in flash photographing, the lens aperture F suitable for ensuring proper exposure to a film depends, as well known, on the type of the flashbulb used, and the sensitivity of the film used. If a guide number for a particular flashbulb is given by G, then there is the following relation between the guide number G, the proper exposure F, and the distance D between the camera and the photographic object.

$$F = G/D \quad (1)$$

The present invention intends to provide a shutter alarm device to facilitate setting of a suitable lens aperture satisfying the above formula. For a given shutter there is a maximum allowable lens aperture $F_{max}$ and a minimum allowable lens aperture $F_{min}$, and each flashbulb has its own minimum allowable distance $D_{min}$ for the given maximum lens aperture $F_{max}$ and its own maximum allowable distance $D_{max}$. In other words, there are established the following relations.

$$F_{min} < F < F_{max} \quad (2)$$
$$D_{min} < D < D_{max} \quad (3)$$

For successful photographing with a flashbulb, all the relations represented by the Formulae 1, 2, and 3 as defined above should be met, or the conditions of the Formula 1 should be valid in the lens aperture and distance ranges as defined by the Formulae 2 and 3.

In a known focussing device having a means for automatically controlling lens aperture, the conditions of the Formula 1 are at least partially satisfied responsive to rotation of a distance ring thereof, but there is no means provided for checking the conditions of the Formulae 2 and 3, for instance no means is provided for generating an alarm signal to limit rotation of the distance ring in the case that the distance is outside of the conditions of the Formula 3. The lack of such checking tends to result in failure in flash photographing.

For example, if a flashbulb having a guide number 80 is used with a shutter capable of varying the lens aperture in the range of $F=2.0$ to $F=16$, then the minimum allowable distance is to be $80/16=5$ (meters). It is usually believed that for such a flashbulb, the condition of $5 < D < 10$ should be fulfilled. Should the aforesaid shutter, which is previously used at a distance of 2 meters be utilized for photographing an object at a distance of 3 meters with the aforesaid flashbulb of guide number 80, it is apparent that such photographing will not result in success.

Therefore, the principal object of the present invention is to provide a shutter alarm device capable of giving an alarm to the operator responsive to rotation of a distance ring of the shutter if the conditions of the aforesaid Formulae 1, 2 and 3 are not satisfied simultaneously. Such alarm according to the present invention can be produced in the following manner.

(a) For a short distance less than the minimum allowable distance, with a given guide number, either or both a click feeling to the operating hand or a clicking signal is generated.

(b) For a long distance in excess of the maximum allowable distance, for a given guide number, e.g. longer than 10 meters, the rotation of the distance ring is blocked.

(c) For the given guide number of a flashbulb, a click sound is generated by means of a combination of an escape wheel, an anchor, suitable gearing means, etc., provided that the conditions of the Formulae 1 to 3 are not satisfied.

(d) For the given guide number of a flashbulb, a click sound is generated by means of a combination of an escape wheel, an anchor, suitable gearing means, etc., provided that the conditions of the Formulae 1 to 3 are satisfied.

The above and other objects will become obvious to those skilled in the art by careful reference to the following description of the present invention taken in conjunction of the accompanying drawings, in which.

The same reference numerals and symbols represent the same parts and components throughout the drawings.

Figure 1:
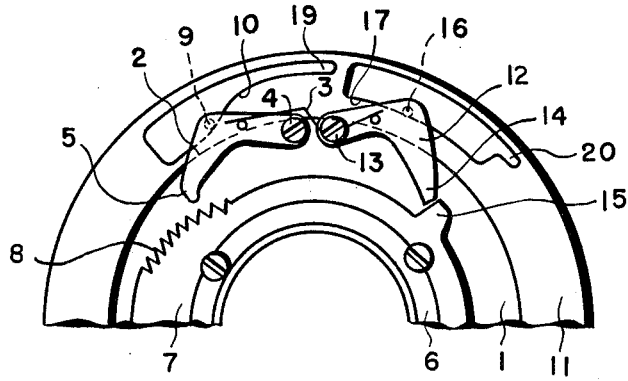
FIG. 1 is a schematic plan view of a shutter alarm device embodying the present invention, shown in the state as mounted on the upper half of a distance ring.

Referring to FIG. 1, a first sensing member 2, which is to sense a distance shorter than a certain minimum allowable distance, is rotatably secured to a shutter casing 1 by means of a pivot pin 4 and biased by a spring 3 in a counter-clockwise direction around the pivot pin 4. The hook-shaped tip 5 of the first sensing member 2 is positioned opposite a first click cam 8 formed on the periphery of a distance ring 7, which is rotatable around a core ring 6. In order to effect operative engagement between the first sensing member 2 and the first click cam 8 under certain conditions, a first actuating cam surface 10 is formed on a guide number ring 11, on which a pin 9 secured on the sensing member 2 is slidably seated.

A second sensing member 12, which is to sense a distance further than a certain maximum allowable distance, is similarly pivoted to the shutter casing 1 by a pivot pin 13 and biased by the spring 3 in a clockwise direction. The tip 14 of the second sensing member 12 is positioned opposite a projection 15 formed on the distance ring 7, and a pin 16 on the second sensing member 12 is slidably seated on a second actuating cam surface 17 formed on the guide number ring 11, so as to effect operative engagement between the tip 14 and the projection 15 upon actuation of the member 12.

Figure 3:
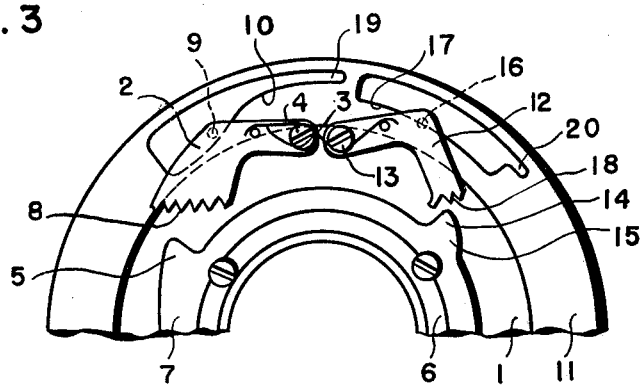

It is also permissible to form a hook-shaped tip 5 on the distance ring 7 while forming a first click cam 8 on the first sensing member 2 secured on the shutter casing, as shown in FIG. 3. It is preferable to form a sawtoothed surface or second click cam 18 on the projection 15 to facilitate fine adjustment, as will be described in detail hereinafter.

The first actuating cam surface 10 in this particular embodiment is formed as a recess on the guide number ring 11 and acts to cause operative engagement between the hook-shaped tip 5 and the first click cam 8 upon a certain predetermined rotation of the guide number ring 11 by means of the pin 9. The tail end portion 19 of the cam surface 10 is to rotate the first sensing member 2 in a clockwise direction by means of the pin 9 so as to keep the hook-shaped tip 5 away from the first click cam surface 8 during daylight photographing.

The second actuating cam surface 17 of this embodiment is also made as a recess on the guide number ring 11 and acts to cause operative engagement between the tip 14 of the second sensing member 12 and the projection 15 by means of the pin 16 under certain conditions during flash photographing. The tail end portion 20 of the cam surface 17 is to deflect the tip 14 of the sensing member 12 away from the locus of the projection 15 during daylight photographing.

With the aforementioned structure, the initial position of the hook-shaped tip 5 of the first sensing member 2 with respect to the first click cam 8 on the distance ring is determined by the actuating cam surface 10 upon setting of the guide number ring 11 in accordance with the guide number of a flashbulb being used. At the same time, the tip 14 of the second sensing member 12 is so positioned as to engage with the projection 15 at $D=D_{max}$, which $D_{max}$ is substantially constant, and the distance ring 7 is blocked at $D_{max}$ and cannot be turned any further once the tip 14 is brought into engagement with the projection 15 in this particular embodiment. In rotating the distance ring 7 for focusing, if the photographic object is located closer to the camera than a certain predetermined minimum allowable distance, the hook-shaped tip 5 of the first sensing member 2 is engaged with the first click cam 8 on the distance ring 7 to cause intermittent click feeling to the operator and to generate a click sound. Thus, an alarm for a distance shorter than the minimum allowable distance according to the aforesaid paragraph (a) is achieved. For an excessively long distance, the counter-clockwise rotation of the distance ring 7 is effectively blocked at $D=D_{max}$, as described in the foregoing. Accordingly, the alarm action according to the aforesaid paragraph (b) is also achieved satisfactorily.

During daylight photographing, the guide number ring 11 is turned counter-clockwise to its extremity. Thus, the pin 9 on the first sensing cam 2 is brought to the tail end 19 of the first actuating cam 10 to set the hook-shaped tip 5 thereof away from the locus of the first click cam 8, and the pin 16 on the second sensing cam 12 is brought to the tail end 20 of the second actuating cam surface 17 to deflect the tip 14 thereof away from the locus of the projection 15, as described in the foregoing. Consequently, the distance ring 7 can be set at any suitable position without being limited by the cam means 8 and 15.

Figure 2:
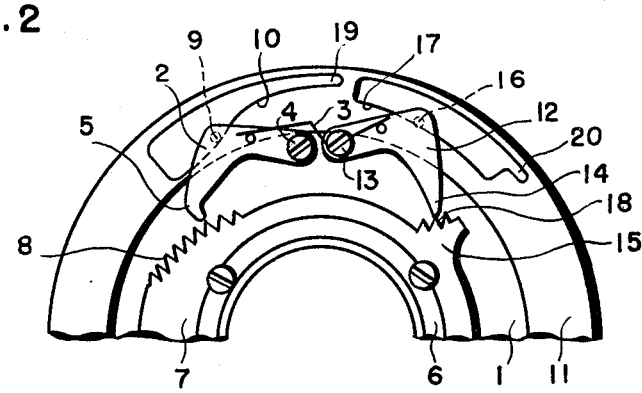
FIGS. 2 and 3 are similar views to FIG. 1, illustrating modifications of the device of FIG. 1.

In order to facilitate fine adjustment and to generate a clicking alarm at the maximum allowable distance $D_{max}$, it is possible to form a second click surface 18 on the projection 15, as illustrated in FIG. 2. As described in the foregoing, the locations of the clicking cam means and the tip ends actuating such click means can be interchanged as shown in FIG. 3.

Figure 4:
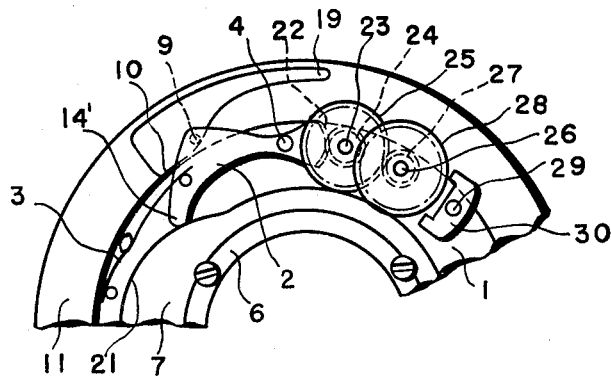
FIG. 4 is a partial schematic view showing another embodiment of the present invention.
Figure 5:
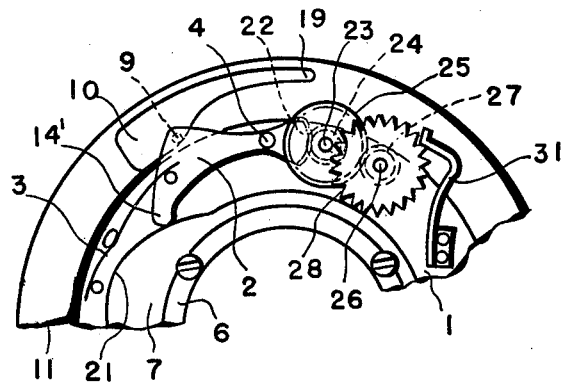
FIG. 5 is a view similar to FIG. 4, illustrating a modification of the device.

FIG. 4 and 5 illustrate another embodiment of the present invention, in which gears are used for generation of alarm sound. In FIG. 4, a first sensing member 2, which is to generate alarm signal for a distance shorter than a certain minimum distance in flash photographing, is pivotally connected to a shutter casing 1 by a pivot pin 4 and a spring 3 is associated with the first sensing member 2 to bias it in a counter-clockwise direction. A tip 14' of the first sensing member 2 is positioned opposite a cam surface 21 formed on a distance ring 7, which is rotatable around a core cylinder 6. To control the engagement between the tip 14' and the cam surface 21, a pin 9 is secured on the sensing member 2 and kept in slidable contact with a first actuating cam surface 10 formed on a guide number ring 11. A sector gear 22 is provided at the opposite tip of the first sensing member 2, and a gear 24 rotatably mounted on the shutter casing 1 by a pivot pin 23 is meshed with the sector gear 22. The angular movement of the first sensing member 2 is amplified by a suitable gearing means, such as a gear 25 integral with the gear 24 and a gear 27 pivotally mounted on a pin 26, and transmitted to an escape wheel 28 integral with the gear 27. The escape wheel 28 cooperates with an anchor 30 to generate an alarm sound.

In FIG. 4 there is not shown any means for signalling a long distance in excess of a certain maximum allowable distance. It is, however, possible to mount a second sensing member similar to the first sensing member 2 to sense such a long distance or to provide a stopping means to block the rotation of the distance ring in excess of the maximum allowable distance, as in the preceding embodiment.

In operation, by turning the guide number ring 11 in accordance with the guide number of a flashbulb being used, the initial position of the tip 14' of the first sensing member 2 is determined by means of the engagement between the pin 9 and the cam surface 10 formed on the guide number ring. When the distance ring 7 is turned for the purpose of focussing, as long as the distance is smaller than a certain minimum distance, the tip 14' of the first sensing member 2 is engaged with the cam surface 21 formed on the distance ring 7 to rotate the member 2 around the pivot pin 4. Thus, the sector gear 22 is also rotated and such rotation is transmitted to the escape wheel 28 through the series of gears 24, 25, and 27. Accordingly, the anchor 30 is actuated to generate an alarm sound for a too short distance or to indicate the fact that the condition of $F<F_{max}$ is not achieved.

For daylight photographing, the pin 9 of the first sensing member 2 is fitted in the tail end portion 19 of the first actuating cam surface 10 to deflect the tip 14' thereof away from the locus of the cam 21. Thereby, the distance ring 7 can be turned freely without being limited by the sensing member 2, and the focussing can be carried out for any desired distance.

If the first sensing member 2 can be so designed as to make a noticeably large angular movement, then the series of gears for amplifying the movement of the member 2 can be dispensed with and the anchor 30 may be ingaged directly with the sector gear 22 for simplifying the structure. As shown in FIG. 5, a leaf spring 31 can be used instead of the anchor 30 for production of an alarm sound.

Figure 6:
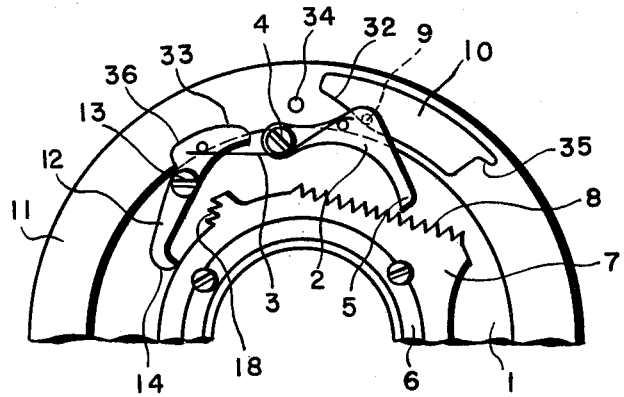
FIG. 6 is a schematic plan view of the upper half of the distance ring equipped with an embodiment of the present invention.

In the preceding embodiments described hereinbefore referring to FIGS. 1 to 5, alarming is made for the conditions unsuitable for flash photographing, but it is also possible to generate a safety signal for conditions suitable for protographing with a certain flashbulb. Referring to FIG. 6, a first sensing member 2 is pivotally secured to a shutter casing 1 by means of a pin 4, and a spring 3 is provided to bias the sensing member 2 in a clockwise direction around the pin 4. A sharpened tip 5 of the sensing member is positioned opposite to a first click cam 8 formed on a distance ring 7, and a pin 9 is secured on the sensing member 2 so as to be kept in slidable contact with a cam surface 32 of a recess 10 on a guide number ring 11 to facilitate the operative engagement and disengagement of the sharpened tip 5 and the first click cam 8. Similarly, a second sensing member 12 is pivotally secured to the shutter casing 1 by means of a pin 13 and biased by the spring 3 in a counter-clockwise direction around the pin 13, and a tip 14 of the second sensing member 12 is positioned opposite a second click cam 18 on the distance ring 7. A cam surface 33 formed on the opposite end of the second sensing member 12 is so positioned as to be engageable with a pin 34 on the guide number ring 11.

Figure 8:
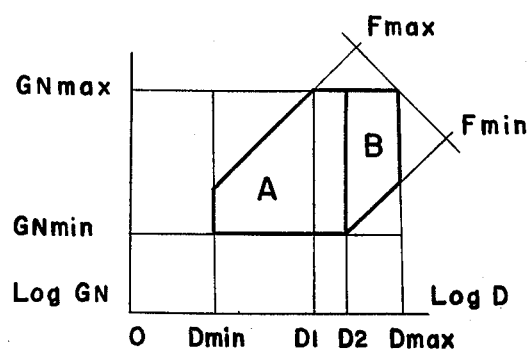
FIG. 8 is a graphic diagram, showing the operative principles of the present invention.

The operative relations between the first and the second sensing members 2 and 12 with respect to the distance ring 7 will now be described in detail referring to FIG. 8. The graph of FIG. 8 illustrates the relations of the formula 1, in which the ordinate represents the guide number G, and the abscissa represents the distance D, both in logarithmic scale, while the lens aperture F as a parameter. The area enclosed by heavy solid lines represents the practiceable area for successful photographing in which $D_1$ represents $G_{max}/F_{max}$ and $D_2$ represents $G_{min}/F_{min}$.

With the device of FIG. 6, the combination of the first sensing member 2 and the first click cam 8 on the distance ring 7 is designed for generating a safety signal for the conditions depicted by the area A in FIG. 8, and the configuration of the cam surface 32 is so selected that for the distance in the range of $D_{min}<D<D_2$ said first sensing member is properly engaged with the first click cam 8 for each selected guide number. On the other hand, the combination of the second sensing member 12 and the second click cam 18 is designed for the area B of FIG. 8, namely for the distance in the range of $D_2<D<D_{max}$ the second sensing member is properly engaged with the second click cam 18 to produce an appropriate signal sound for the use by the operator. Such engagement between the member 12 and the cam 18 is ensured by properly selecting the relative location of the pin 34 on the guide number ring 11 in conjunction with the suitable configuration of the cam surface 33.

The tail end portion 35 of the cam surface 32 formed on the guide number ring 11 is to deflect the first sensing member 2 in a counter-clockwise direction by means of the pin 9 so as to keep the sharpened tip 5 away from engagement with the first click cam 8 on the distance ring 7 for the daylight photographing. Similarly, the tail end 36 of the cam 33 is to rotate the second sensing member 12 in a clockwise direction by means of a pin 34 on the guide number ring 11, so that the sharpened tip 14 thereof is kept away from the locus of the second click cam 18 in order to facilitate daylight photographing.

In operation of the embodiment as illustrated in FIG. 6, the initial positions of the sharpened tips 5 and 14 of the first and second sensing members are determined by means of the cam surface 32 and the pin 34 responsive to the setting of the guide number ring 11 for the guide number of a given flashbulb being used. As the distance ring 7 is turned for focussing, as long as the distance D between the photographic object and the camera is in the range of $D_{min}<D<D_2$, the second sensing member 12 acts to notify the operator whether the conditions of the Formula 1 is satisfied or not. Namely, if the values of G, F, and D are in the area A or B in FIG. 8, a click sound is produced as the distance ring 7 is rotated, while the click sound disappears when such values fall outside of the areas A and B.

For daylight photographing, the pin 9 of the first sensing member 2 is moved into the tail end 35 of the cam surface 32 to keep the sharpened end 5 thereof away from the locus of the first click cam 8 on the distance ring 7, and at the same time the sharpened tip 14 of the second sensing member 12 is deflected away from the locus of the second click cam 18 of the distance ring 7 by means of the pin 34 on the guide number ring 11.

Figure 7:
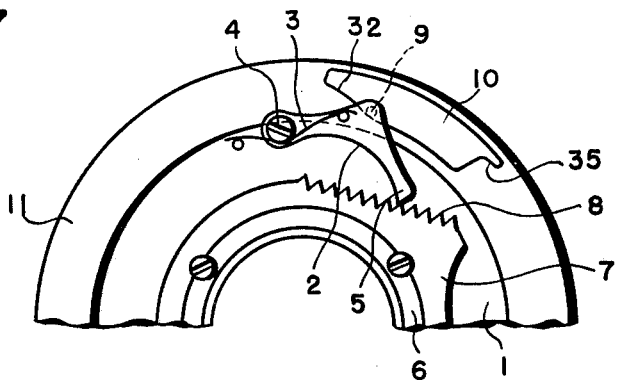
FIG. 7 is a view similar to FIG. 6, illustrating a modification of the device.

FIG. 7 shows another embodiment of the present invention, in which a second sensing member is dispensed with. As regards the effect of the second sensing member 12 in the embodiment of FIG. 6, it can be safely assumed that $D_2=D_{max}$ except very rare special combinations of G, F, and D, the second sensing member 12 and accessories related thereto can be dispensed with, providing that the stroke of the first click cam 8 is elongated by a distance corresponding to a difference $(D_{max}-D_2)$.

As described in the foregoing, according to the present invention, as long as the condition of the Formula 1 is satisfied, a click sound is produced responsive to rotation of the distance ring 7 for flash photographing. Thus, even if the operator forgets to change the guide number setting for daylight photographing from flash photographing, the click sound is generated to remind the operator of the need for such changeover. Thus, false operation of the camera can be effectively prevented.

What we claim is:

1. A shutter alarm device for flash photographing, comprising a stationary shutter casing, a first sensing member pivotally mounted on said shutter casing and provided with a tip, a distance ring rotatable for focusing a cam surface formed on said distance ring so as to be engageable with said tip of said first sensing member for generation of a clicking signal, a second sensing member pivotally mounted on said shutter casing and provided with a tip to stop the rotation of said distance ring in a certain angular position, a guide number ring to be set at an angular position corresponding to the guide number of a flashbulb being used, and a cam surface formed on said guide number ring, said first sensing member having a pin thereon engaged with said cam surface on said guide number ring so that the engagement between the cam surface on said distance ring and the tip of the first sensing member can be controlled by the setting of the guide number ring and the angular position of the distance ring, whereby said first sensing member senses the maximum allowable distance while said second sensing member senses the minimum allowable distance for flash photographing.

2. A shutter alarm device for flash photographing according to claim 1, further comprising an anchor means for generating a clicking sound, a gearing means, said first sensing member being engaged with said gearing means for actuating said anchor means responsive to said engagement between said tip of first sensing member and said cam surface on said distance ring.

3. A shutter alarm device for flash photographing according to claim 2 further comprising a speed change gearing means inserted between said first sensing member and said anchor means.

References Cited

UNITED STATES PATENTS 3,198,096   8/1965   Koppen _____ 95—64 XR
3,229,606   1/1966   Gunther et al. _____ 95—64

MORTON ANSHER, Primary Examiner

F. L. BRAUN, Assistant Examiner

U.S. Cl. X.R.

95—45